Figure 1:
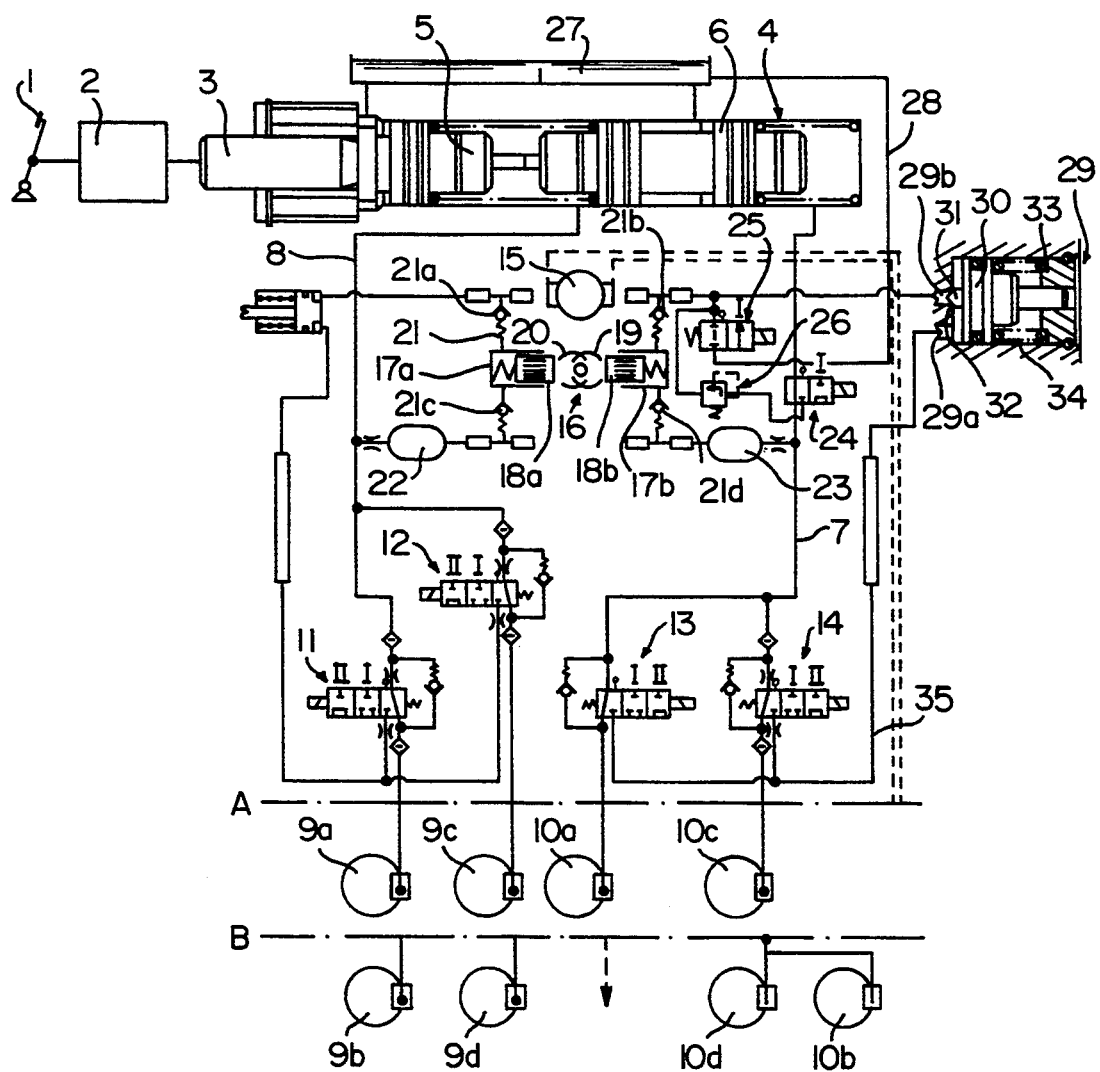

United States Patent [19]
Zirps

[11] Patent Number: 5,390,995
[45] Date of Patent: Feb. 21, 1995

[54] BRAKE PRESSURE CONTROL SYSTEM FOR BRAKING SYSTEMS

[75] Inventor: Wilhelm Zirps, Hemmingen, Germany

[73] Assignee: Robert Bosch GmbH, Stuttgart, Germany

[21] Appl. No.: 852,237

[22] PCT Filed: Dec. 4, 1990

[86] PCT No.: PCT/EP90/02086

§ 371 Date: May 20, 1993

§ 102(e) Date: May 20, 1993

[87] PCT Pub. No.: WO91/08130

PCT Pub. Date: Jun. 13, 1991

[30] Foreign Application Priority Data

Dec. 5, 1989 [DE] Germany ............... 3940180

[51] Int. Cl.⁶ .................................. B60T 13/14
[52] U.S. Cl. .................... 303/116.1; 303/10; 303/113.2
[58] Field of Search .............. 303/115.4, 116.1, 10, 303/11, 116.2, 115.5, 12, 84.2, 116.4, 113.2; 188/352; 137/509; 417/295, 542

[56] References Cited

U.S. PATENT DOCUMENTS

| | | | |
|---|---|---|---|
| 3,079,946 | 3/1963 | Rösler | 137/509 |
| 3,754,567 | 8/1973 | Whitten | 137/509 |
| 4,121,619 | 10/1978 | Pauliukonis | 137/509 X |
| 5,152,586 | 10/1992 | Burgdorf | 303/115.4 X |
| 5,195,809 | 3/1993 | Burgdorf | 303/116.2 X |

FOREIGN PATENT DOCUMENTS

| | | | |
|---|---|---|---|
| 1200089 | 9/1965 | Germany | 137/509 |
| 1550159 | 9/1969 | Germany | 137/509 |
| 0236859 | 11/1985 | Japan | 303/115.4 |

*Primary Examiner*—Robert J. Oberleitner
*Assistant Examiner*—Alfred Muratori
*Attorney, Agent, or Firm*—Edwin E. Greigg; Ronald E. Greigg

[57] ABSTRACT

A brake pressure control system for braking systems of a vehicle with anti-locking and drive slip control in which there is at least one expansion chamber provided between the wheel brake cylinders and the recirculating pump. The expansion chamber includes an inlet and an outlet on the same end with a piston having a closing mechanism thereon that is spring forced to seat the closing mechanism on a seat at the outlet. The valve seat is reduced in size compared with the piston and the spring is in a chamber which is open to the atmosphere. Due to the valve seat being reduced in relation to the area of the piston located in the expansion chamber, a steep closing force gradient is achieved, since even small pressure differences result in large closing force differences, so that the opening and closing pressures lie close together. Based on this additional closing mechanism, provided on the expansion chamber, the requirement for a separate valve for brake pressure control is no longer required.

14 Claims, 2 Drawing Sheets

BRAKE PRESSURE CONTROL SYSTEM FOR BRAKING SYSTEMS

STATE OF TECHNOLOGY

The invention concerns a brake pressure control system for braking systems with anti-locking and drive slip control as set forth hereinafter.

Brake pressure control systems of this type for braking systems with a closed anti-locking control system and a drive slip control system are known, and are in use in various design forms. With these, in the case of a wheel having a tendency to lock, the anti-locking control is actuated, with the brake fluid being returned to the main brake cylinder by means of a recirculating pump, in order to reduce pressure in the respective wheel brake cylinders.

From DE-OS 32 15 739, a drive slip control system for vehicles is known, where in order to reduce brake pressure, a pressure agent is released, by means of a control valve, into a storage chamber, and this pressure agent is then recirculated into the connection between the main brake cylinder and the brake pressure control valve by means of a recirculating pump. In this drive slip control system, the recirculating pump is designed as a suction pump, and between the main brake cylinder and the pump intake a connection duct with a change-over valve is interposed.

In the recirculation of brake fluid, a problem arises in that in the case of particular driving conditions, in order to maintain driving stability with controlled brakes, the brake pressure must be very greatly reduced, whilst on the other hand no negative pressure should arise in the braking system, since this could result in the danger of air entering the system. For this reason, in known recirculating pumps, the opening pressure of an inlet valve located on the recirculating pump is set at >1 bar. By this means, the delivery chamber of the pump is no longer filled at brake pressures of <1 bar, and the recirculation is interrupted. However, a disadvantage here is that no brake fluid can be taken in from the ventilated reservoir by means of the recirculating pump, and so a desired multiple use for the anti-locking or drive slip control system is not possible.

It is possible to limit the brake pressure towards the lower end, generally in the case of recirculation, in principle via an additional servo-valve. Here, the servo-valve is built in upstream of the inlet valve of the recirculating pump, in relation to the return flow, and thus prevents the pressure in the recirculation canal from dropping below the previously set value. Downstream, behind the servo-valve, the duct which is connected to a reservoir, leads into the suction port of the pump. Thus should the need arise, brake fluid can be taken from the reservoir via the recirculating pump, without the pressure in the recirculating pump falling unacceptably.

In familiar servo-valve designs, these are valves with spring-loaded spherical or conical closing bodies through which the flow is in the direction of opening. However, these valves have a relatively large hysteresis between opening and closing pressure, and therefore cannot be set precisely. This results from the fact that the opening and closing of a spring-loaded valve does not occur suddenly, because an ideal and absolutely precisely-shaped seat geometry cannot be realised. Rather, inaccuracies in shape, roughness and guide clearance lead to the situation where on closing the valve, the closing body and the valve seat initially touch each other only in certain places. Only after increasing the closing force, and the alignment, and the elastic deformation associated with it, does the closing body make contact with the full extent of the valve seat, and thus effect a complete seal. The same applies in reverse for the opening process. Between the fully opened and closed state, the closing force must be increased by a certain amount. This necessary closing force difference does decrease with improved seat geometry, but the capabilities of production engineering and the corresponding costs, impose limits.

A small valve hysteresis, i.e. a small pressure difference between the opening and closing of the valve is, however, necessary in order to be able to achieve as low a brake pressure level as possible, for reasons of control technology, whilst on the other hand safely avoiding negative pressure.

ADVANTAGES OF THE INVENTION

A brake pressure control system with the features set forth herein makes it possible to avoid the occurrence of negative pressure in the brake circuits, in that on the one hand through the expansion chamber, a fluid volume is taken up for the necessary pressure-lowering, and on the other hand through the closing mechanism which is mobile within the expansion chamber, a steep closing force gradient is achieved. This is achieved by the fact that the closing force is influenced by a large—in relation to the valve seat—area of the piston located in the expansion chamber. Due to the relationship between the valve seat and the relatively large piston area, even small pressure differences result with large closing force differences, from which a close proximity of opening and closing pressure results. The small valve hysteresis which results from the small pressure difference between opening and closing likewise facilitates the adjustment of the closing mechanism.

Alterations in the set pressure which could arise during a longer period of operation are very small, since alterations in the valve seat width caused by wear have only a small effect on the closing force of the mechanism.

A further advantage is realised in that the closing mechanism is open over longer operating periods, and that narrow slit openings arise only at the immediate opening and closing phases. Thus the critical operating phase during which, due to a high rate of flow of the brake fluid, a greater amount of wear is caused, is reduced to a minimum duration. The use of closing bodies of plastic or rubber is thus also possible.

Finally, the combination of the expansion chamber with the closing mechanism additionally provides an economic solution. In contrast to a solution which would require servo-valves superposed before the reservoir, with corresponding springs, guide pistons, top plates and seals, in this case only an additional closing device, provided in the expansion chamber, is required. By this means, therefore, the need for additional space for a possible separate valve arrangement, is likewise obviated. The solution proposed here is considerably cheaper, in particular when compared to pressure control systems using solenoid valves. Also, the solenoid valves, which in themselves are already considerably more expensive, would also require a power supply and control system.

DRAWING

The invention is explained below on the basis of the drawing.

Figure 2:
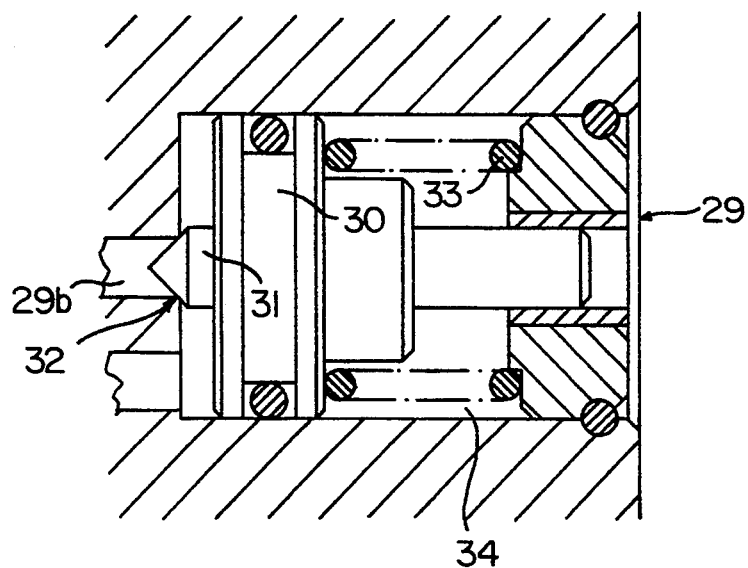
Figure 3:
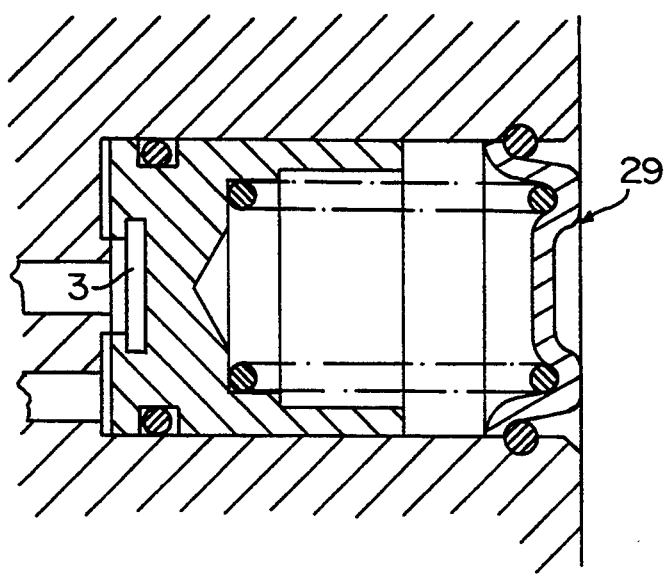

The figures show the following:

FIG. 1 shows a block diagram representation of a control system for a vehicle brake system with two system variants A and B, FIG. 2 shows an enlarged view of the expansion chamber seen in FIG. 1, and FIG. 3 shows a further design form of the expansion chamber in accordance with this invention.

From the control system, shown in FIG. 1, for the brake pressure control of a vehicle braking system, a brake pedal 1, a brake booster 2, and a push rod 3 of a main brake cylinder 4 can be seen. The push rod 3 acts on a pushrod piston 5 and on a floating piston 6. The main brake cylinder 4 is connected to the wheel brake cylinders 9a, b of the left front wheels, and 9c, d of the right front wheels, and with the wheel brake cylinders 10a, b of the left rear wheels and 10c, d of the right rear wheels, via the brake fluid lines 7 and 8. Variants a and b of the wheel brake cylinders 9 and 10 represent different system variants. The system variant A differs from the system variant B in that in system variant A, the front wheels are respectively supplied with brake fluid via the solenoid valves 11 and 12, whilst the rear wheels in system variant A are supplied with brake fluid via the solenoid valves 13 and 14, and in system variant B only via the solenoid valve 14, whilst in this system variant there is the possibility of connecting to the control system, other control devices, not shown here, instead of the drive slip control system.

A recirculating pump 16 driven by a motor 15 is also incorporated in the brake pressure control system. This consists of delivery plungers 18a, b which can move in pump cylinders 17a, b, an which are driven via a eccentric 20 located on a pump drive shaft 19. Non-return one way valves 21 are provided on the pump cylinders 17a, b; these valves are designed according to their location in relation to the pump cylinders 17a, b as pump inlet valves 21a, b or pump outlet valves 21c, d.

In the brake fluid lines leading away from the recirculating pump 16, damper chambers 22 and 23 are interposed.

Two further solenoid valves 24 and 25, are also connected to the brake pressure control system, as well as a pressure control valve 26. Via the solenoid valve 25, brake fluid can be taken in by the recirculating pump 16 from the reservoir 27 through the brake line 28.

The expansion chamber 29 has an inflow orifice 29a as well as a discharge orifice 29b. The closing mechanism is formed by the piston 30 and the closing body 31 connected to it, and the valve seat 32 fitted directly at the discharge orifice 29b. The piston 30 is moved against a spring 33 which is fitted .in a spring location 34.

The brake pressure control system under discussion functions as follows:

Vehicle braking is initiated;by pressing on pedal 1, with the operating force being amplified in a brake booster 2, not described in further detail here, and transmitted to the push rod 3 of the main brake cylinder 4. With simultaneously increasing brake pressure, brake fluid is displaced by the push rod piston 5 and the floating piston 6.

Via brake fluid lines 7 and 8 and via the solenoid valves 11, 12 and 14 (in system variant B) or via the solenoid valves 11, 12, 14 and 13 (in system variant A), the displaced brake fluid enters the wheel brake cylinders 9a to 9d of the front wheels, and 10a to 10d of the rear wheels. Where a wheel has a tendency to lock, the motor 15 of the recirculating pump 16 is switched on via a sensor and control device, not visible in the drawing. This motor drives the recirculating pump 16, which consists of the delivery plungers 18a, 18b which can move in pump cylinders 17a, b, and the pump inlet one-way valves 21a, 21b and pump outlet one-way valves 21c, 21d. At the same time, the solenoid valve 14 is actuated and brought into the switching position II. In system variant B, brake fluid flows from both wheel brake cylinders of the rear wheels 10b, 10d, in system variant A only from the wheel brake cylinder of the rear wheel 10c, via the duct 35 to the expansion chamber 29.

The expansion chamber 29 takes up the brake fluid volume from the wheel brake cylinders for the purpose of lowering the pressure, with the piston 31 of the expansion chamber 29 moving to the right—in relation to the drawing—against the spring 33. Since the spring location is open to the atmosphere, in order to push the piston 31 against the spring 33, as well as to open the closing mechanism which consists of the closing body 31 and the valve seat 32, a pressure of >1 bar is necessary in the expansion chamber 29. This is to exclude the possibility that any negative pressure occurring in the brake pressure control system, possibly at the pump inlet valve 21b of the recirculating pump 16, propagates via the expansion chamber 29 through the brake line 35 and the solenoid valves 13 and 14 into the wheel brake cylinders of tile rear wheels 10a to 10d.

The plunger 18b delivers brake fluid from the expansion chamber 29 via the pump inlet valve 21b and the pump outlet valve 21d and the damper chamber 23, into the brake pipe 7, and from here via the solenoid valve 24 into the main brake cylinder 4.

If, in the drive slip control system, it is necessary to brake a rear wheel (system variant A), then the motor 15 of the recirculating pump 16 is switched on via a sensor and control device, which cannot be seen in the drawing. At the same time, the solenoid valves 25 and 26 are activated and brought into switching position I. Via the brake pipe 28, the solenoid valve 25 and the pump inlet valve 21b, the delivery plunger 18a can draw in brake fluid from the reservoir 27, and deliver it via the pump outlet valve 21d into the brake pipe 7. Via the sensor and control device, the solenoid valves 13 and 25 are activated accordingly and the rear wheels are braked. Alternatively, it is possible, as in system variant B, to connect another control device, not shown here, to the recirculating pump 16 instead of a drive slip control system.

In FIG. 2, the expansion chamber 29 which can be seen in the brake pressure control system of FIG. 1 is shown in an enlarged view. The closing mechanism of the expansion chamber 29 is formed by the closing body 31 connected with the piston 30, and the valve seat 32 fitted immediately at the discharge orifice 29b. In order to reduce pressure in the wheel brake cylinders, a volume of brake fluid is drawn from them and delivered to the expansion chamber 29. Here, the piston 30 moves to the right against a spring 33. Since the spring location 34, as already explained, is open to the atmosphere, in order to move the piston 30 as well as to open the closing mechanism, a pressure of >1 bar is necessary in the expansion chamber 29. The closing mechanism has a very steep closing force gradient, since the closing force is influenced by the larger—relative to the valve seat 32—area of the piston 30. For this reason, even small pressure differences result in large closing force differences, so that the opening and closing pressures lie close together. Thus a small valve hysteresis is achieved.

The design form of the expansion chamber 29 of FIG. 3 differs from the design form shown in FIG. 2 in that the closing body 31 is of plastic or rubber. The further characteristics are realised in accordance with the expansion chamber 29 shown in FIG. 2.

I claim:

1. A brake pressure control system for braking systems with anti-locking and drive slip control comprising a main brake cylinder (4), which is operated by a brake pedal (1), for the creation of brake pressure for at least one brake circuit, in which brake lines (7, 8) connect said main brake cylinder with corresponding wheel brake cylinders (9a, 9b), (9c, 9d), (10a, 10b), (10c, 10d), brake pressure control solenoid valves (11, 12, 13, 14) are interposed into said brake lines (7, 8) which connect the main brake cylinder (4) to the wheel brake cylinders (9a, 9b), (9c, 9d), (10a, 10b), (10c, 10d), to interrupt the connection for anti-locking, as well as in a case of recirculation of brake fluid effected by a recirculation pump (16), the wheel brake cylinders (9a, 9b), 19c, 9d), (10a, 10b), (10c, 10d) are connected with the main brake cylinder (4), inlet valves (21a, 21b) and outlet valves (21c, 21d) are located on the recirculating pump (16), via which brake fluid is drawn from a reservoir (27) and further delivered, with the outlet valves (21c, 21d) connected to damper chambers (22, 23), between the wheel brake cylinders (10a to 10d) and the recirculating pump (16) there is at least one expansion chamber (29) on which are provided at least one inflow orifice (29a) and one discharge orifice (29b) and a closing mechanism which includes a closing body (31) connected to a piston (30), with a valve seat (32) being fixed directly at the discharge orifice (29b).

2. A brake pressure control system in accordance with claim 1, in which a diameter of the valve seat (32) is reduced in relation to an area of the piston (30).

3. A brake pressure control system in accordance with claim 2, in which the closing body (31) is formed of plastic or rubber.

4. A brake pressure control system in accordance with claim 2, in which the piston (30) is moved against a spring (33).

5. A brake pressure control system in accordance with claim 4, in which the piston (30) is movable at a pressure of >1 bar in the expansion chamber (29).

6. A brake pressure control system in accordance with claim 1, in which the closing body (31) is of plastic or rubber.

7. A brake pressure control system in accordance with claim 6, in which the piston (30) is moved against a spring (33).

8. A brake pressure control system in accordance with claim 7, in which the piston (30) is movable at a pressure of >1 bar in the expansion chamber (29).

9. A brake pressure control system in accordance with claim 1, in which the piston (30) is moved against a spring (33).

10. A brake pressure control system in accordance with claim 9, in which the piston (30) is movable at a pressure of >1 bar in the expansion chamber (29).

11. A brake pressure control system in accordance with claim 1, in which the recirculating pump (16) has a motor (15), as well as delivery plungers (18a, 18b) which move in pump cylinders (17a, 17b) and which are driven by said motor, and brake fluid is returned from the expansion chamber (29) via the inlet valves (21a, 21b), the pump cylinders (17a, 17b) and outlet valves (21c, 21d) located on the recirculating pump (16), and via the damper chamber (23), to the main brake cylinder (4).

12. In a brake pressure control system which includes an expansion chamber (29), said expansion chamber includes an inflow orifice and an outflow orifice, a valve seat surrounding said outflow orifice, a piston (30) with a closing body (31) and a spring which applies a force on the piston to seat said closing body on said seat, said spring is in a chamber which is open to the atmosphere, and said outflow orifice communicates with an inlet of a recirculating pump (16), which forms part of said brake pressure control system.

13. In a brake pressure control system including an expansion chamber as set forth in claim 12, said spring has a force which is greater than a force resulting by one bar acting against said piston and said spring.

14. In a brake pressure control system in accordance with claim 12, said closing body (31) is formed of plastic or rubber.

* * * * *